|||||||||||||||||||||||||||||||||||||||||||||||||||
US010554075B2

(12) United States Patent
Navarro et al.

(10) Patent No.: US 10,554,075 B2
(45) Date of Patent: *Feb. 4, 2020

(54) UNINTERRUPTIBLE POWER SUPPLY SYSTEMS AND METHODS USING INTERCONNECTED POWER ROUTING UNITS

(71) Applicant: Eaton Intelligent Power Limited, Dublin (IE)

(72) Inventors: George Arthur Navarro, Raleigh, NC (US); Vincent Edward Wilder, Clayton, NC (US); Goran Mandic, Wake Forest, NC (US)

(73) Assignee: Eaton Intelligent Power Limited (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,194

(22) Filed: Oct. 8, 2018

(65) Prior Publication Data
US 2019/0044374 A1 Feb. 7, 2019

Related U.S. Application Data

(63) Continuation of application No. 15/139,957, filed on Apr. 27, 2016, now Pat. No. 10,103,572.

(51) Int. Cl.
*H02J 9/00* (2006.01)
*H02J 9/06* (2006.01)
(52) U.S. Cl.
CPC .............. *H02J 9/061* (2013.01); *H02J 9/062* (2013.01)
(58) Field of Classification Search
CPC ....................................................... H02J 9/061

USPC ........................................................... 307/23
See application file for complete search history.

(56) References Cited

U.S. PATENT DOCUMENTS

| 9,647,491 B2* | 5/2017 | Navarro | H02J 9/06 |
| 10,103,572 B2* | 10/2018 | Navarro | H02J 9/062 |
| 2005/0036253 A1* | 2/2005 | Tian | H02J 3/38 361/66 |
| 2011/0187197 A1* | 8/2011 | Moth | H02J 9/062 307/66 |

(Continued)

FOREIGN PATENT DOCUMENTS

WO    WO 2010/038152 A1    4/2010

OTHER PUBLICATIONS

Loeffler, Chris "Which UPS is right for the job?", Thought Leadership White Paper, Eaton, Sep. 2009, Retrieved from the Internet at URL http://www.eaton.com/powerquality.

(Continued)

*Primary Examiner* — Ryan Jager
(74) *Attorney, Agent, or Firm* — Stanek Lemon Crouse & Meeks, P.A.

(57) ABSTRACT

A system includes a plurality of power routing units. Each of the power routing units includes a first AC port, a second AC port, and a static switch configured to couple and decouple the first AC port and the second AC port. Each of the power routing units further includes a DC port and a bidirectional converter circuit coupled between the second AC port and the DC port. The DC ports of the power routing units are coupled in common to a DC bus and the system further includes a control circuit configured to control the power routing units to provide power transfer between at least two of the power routing units via the DC bus.

13 Claims, 9 Drawing Sheets

(56) References Cited

U.S. PATENT DOCUMENTS

| | | | | |
|---|---|---|---|---|
| 2014/0097680 A1* | 4/2014 | Navarro | ............... | H02J 9/06 |
| | | | | 307/23 |
| 2014/0117764 A1* | 5/2014 | Navarro | ............. | H02J 9/062 |
| | | | | 307/64 |
| 2015/0008744 A1* | 1/2015 | Navarro | ............. | H02J 9/061 |
| | | | | 307/64 |
| 2015/0008745 A1* | 1/2015 | Navarro | ............... | H02J 9/06 |
| | | | | 307/64 |
| 2015/0357798 A1* | 12/2015 | Loeffler | ............. | H02B 1/20 |
| | | | | 361/624 |
| 2017/0207654 A1* | 7/2017 | Navarro | ............... | H02J 9/06 |
| 2017/0294782 A1* | 10/2017 | Navarro | ............... | H02J 5/00 |
| 2017/0317525 A1* | 11/2017 | Navarro | ............. | H02J 9/062 |

OTHER PUBLICATIONS

Eaton Power XPert 9395 UPS, Product Brochure, http://eaton.com/9395 (2013).

Notification of Transmittal of the International Search Report and the Written Opinion of the International Searching Authority, or the Declaration, PCT/US2017/028599, dated Aug. 28, 2017, 10 pages.

* cited by examiner

UNINTERRUPTIBLE POWER SUPPLY SYSTEMS AND METHODS USING INTERCONNECTED POWER ROUTING UNITS

CROSS-REFERENCE TO RELATED APPLICATION

This application is a continuation of U.S. patent application Ser. No. 15/139,957, filed Apr. 27, 2016, the contents of which is hereby incorporated herein by reference in its entirety.

BACKGROUND

The inventive subject matter relates to power distribution systems and methods and, more particularly, to uninterruptible power supply (UPS) systems and methods.

UPS systems are commonly used in installations such as data centers, medical centers and industrial facilities. UPS systems may be used in such installations to provide backup power to maintain operation in event of failure of the primary utility supply. These UPS systems commonly have an "on-line" configuration including a rectifier and inverter coupled by a DC link that is also coupled to an auxiliary power source, such as a battery, fuel cell or other energy storage device. Other UPS systems may use standby, line-interactive or other architectures.

UPS systems may be implemented using modular assemblies. For example, a UPS system may include multiple UPS modules, each of which may include, for example, a rectifier, an inverter and a DC/DC converter for interfacing to a battery. The UPS modules may be mounted in a common chassis, along with control and interface circuitry, such as bypass switches and the like. The UPS modules may be designed to operate in parallel to provide scalable power capacity, e.g., the modules may be coupled in common to an AC source, a DC source (e.g., a battery) and/or a load. An example of such a modular UPS assembly is the Eaton® Power XPert 9395 UPS (described at http://powerquality.eaton.com), which may be configured to include two or more uninterruptible power modules (UPMs), each of which include a double conversion UPS circuit including a rectifier, inverter and battery converter coupled to a common DC bus. Other modular UPS architectures are described in U.S. patent application Ser. No. 13/936,741 entitled "UPS Systems and Methods Using Variable Configuration Modules,", filed Jul. 8, 2013 and incorporated herein by reference.

SUMMARY

Some embodiments of the inventive subject matter provide a system including a plurality of power routing units. Each of the power routing units includes a first AC port, a second AC port, and a static switch configured to couple and decouple the first AC port and the second AC port. Each of the power routing units further includes a DC port and a bidirectional converter circuit coupled between the second AC port and the DC port. The DC ports of the power routing units are coupled in common to a DC bus and the system further includes a control circuit configured to control the power routing units to provide power transfer between at least two of the power routing units via the DC bus.

In some embodiments, the first AC port of a first power routing unit may be coupled to a first AC power source and the first AC port of a second power routing unit may be coupled to a second AC power source. The control circuit may be configured to cause the second power routing unit to provide power to the first power routing unit via the DC bus responsive to a failure of the first AC power source and/or a failure of the static switch of the first power routing unit.

In further embodiments, the second AC port of the first power routing unit may be coupled to a first load and the second AC port of the second the power routing unit may be coupled to a second load. The second power routing unit may be configured to provide power to the first load from the second AC power source via the static switch and converter circuit of the second power routing unit, the DC bus and the converter circuit of the first power routing unit.

In some embodiments, the control circuit may be configured to control the power routing units to provide power to a first power routing unit from a second power routing unit and a third power routing unit via the DC bus. The control circuit may be configured to operate the second power routing unit to regulate a voltage on the DC bus and to operate the third power routing unit as a regulated current source to provide power to the first power routing unit. The second AC ports of the first, second and third power routing units may be coupled in common to an AC power source, and the first AC ports of the first, second and third power routing units may be coupled to respective first, second and third loads.

According to further embodiments, the first AC ports of a first power routing unit and a second power routing unit may be coupled in common to an AC power source, the second AC ports of the first and second power routing units may be coupled to respective first and second loads, and the control circuit may be configured to concurrently provide power from the AC power source to the first load via the static switch of the first power routing unit and to the second load via the converter circuits of the first and second power routing units. The control circuit may be configured to operate two of the power routing units to provide a multiple converter power chain from an AC source to a load coupled to one of the two power routing units.

In some embodiments, the control circuit may include respective local control circuits in respective ones of the power routing units and a master controller configured to control the local control circuits of the power routing units.

In some embodiments, the control circuit may include respective local control circuits positioned in the power routing units and configured to operate the associated converter circuit to selectively provide a first mode wherein the converter circuit regulates a voltage on the DC bus and a second mode wherein the converter circuit provides a regulated current to the DC bus.

In some embodiments, the system may further include a DC power source coupled to the DC bus.

In further embodiments, the static switch may be a first static switch and each of the power routing units may further include a third AC port and a second static switch configured to couple and decouple the third AC port and the second AC port.

Further embodiments provide a power routing unit including a first AC port configured to be coupled to an external AC source, a second AC port configured to be coupled to an external load, and a static switch configured to couple and decouple the first AC port and the second AC port. The power routing unit further includes a DC port configured to be coupled to an external DC bus, a bidirectional converter circuit coupled between the second AC port and the DC port, and a control circuit configured to control the static switch and the converter circuit to selectively provide a first mode wherein the converter regulates a voltage on the external DC bus and a second mode wherein the converter provides a regulated current to the external DC bus.

Further embodiments provide methods including providing a plurality of power routing units, each comprising a first AC port, a second AC port, a static switch configured to couple and decouple the first AC port and the second AC port, a DC port, and a bidirectional converter circuit coupled between the second AC port and the DC port. The methods further include coupling the DC ports of the power routing units in common to a DC bus and controlling the power routing units to provide power transfer between at least two of the power routing units via the DC bus.

DETAILED DESCRIPTION

Figure 1:
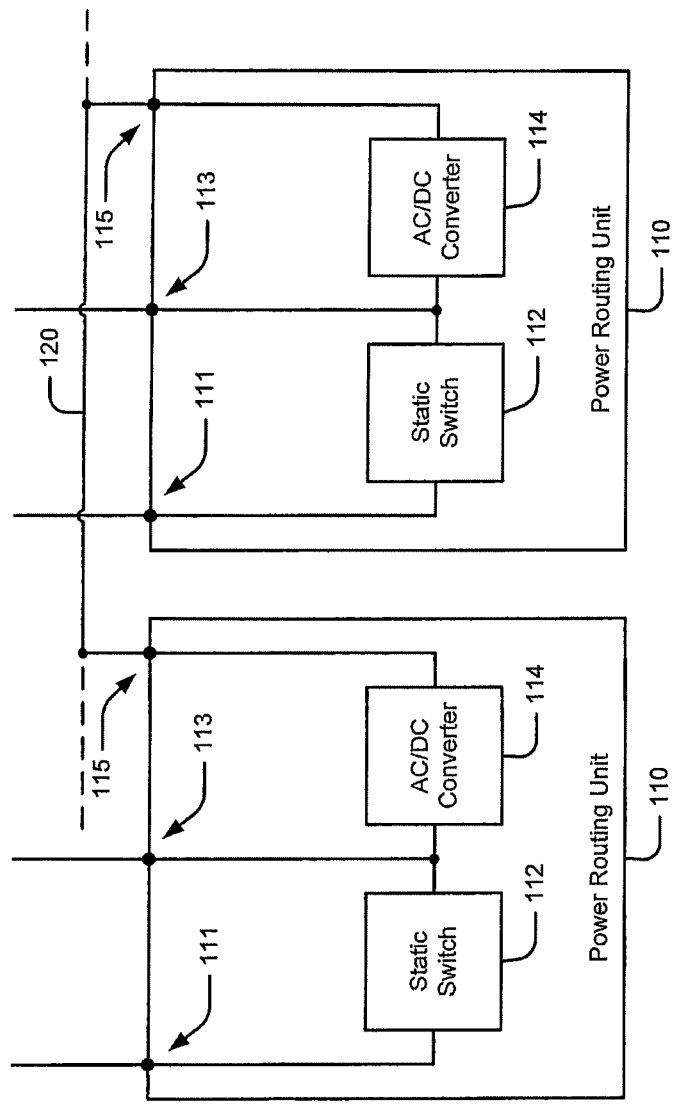
FIG. 1 is a schematic diagram illustrating an uninterruptible power supply (UPS) system using interconnected power routing units according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a system according to some embodiments of the inventive subject matter. The system includes a plurality of power routing units 110, which are connected in common to an external DC bus 120. Each of the power routing units 110 includes at least one static switch 112, which is connected between an AC input port 111 and an AC output port 113 of the power routing unit 110. Each power routing unit 110 further includes at least one bidirectional converter circuit 114, which is coupled between the AC output port 113 and a DC port 115, the latter of which is coupled to the DC bus 120. The converter circuit 114 is configured to support power flows in two directions to support a variety of different arrangements of power routing units 110, as explained in greater detail with reference to FIGS. 3-9.

It will be appreciated that the power routing units 110 may be implemented using any of a number of different types of circuitry. For example, the statics switches 112 may be implemented using any of a variety of different types of solid-state switching devices, such as SCRs or power MOSFETs. The converter circuits 114 may be implemented using different types of converter architectures, such as bridge converter circuits. These circuits may use any of a variety of different types of solid-state switching devices, such as IGBTs or power MOSFETs. The static switches 112 and converters 114 may be controlled using any of a variety of different analog and/or digital control circuits including, but not limited to, microcontroller-based or other types of digital control circuits.

Figure 2:
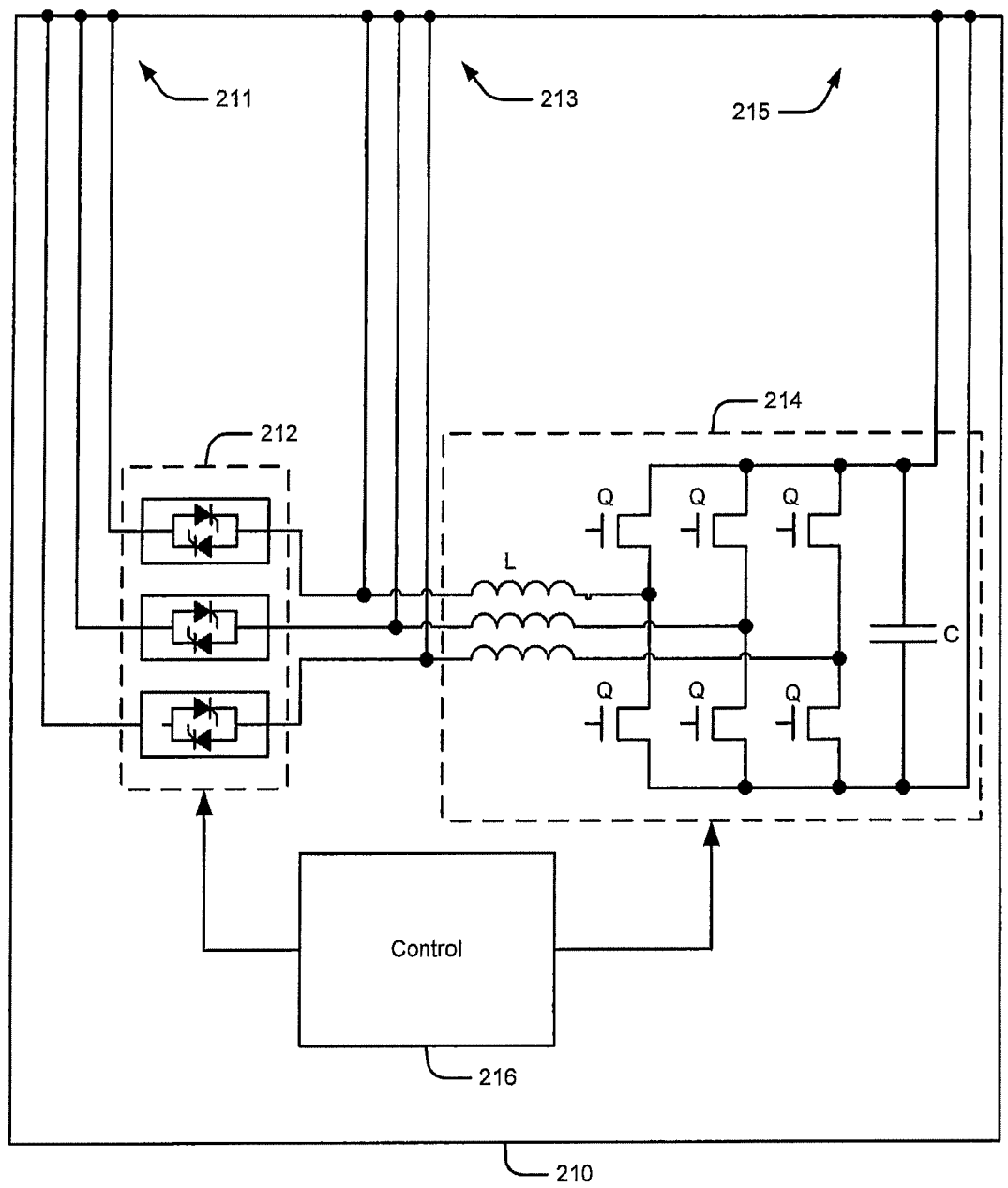
FIG. 2 is a schematic diagram illustrating an example of a circuit configuration for the power routing units of FIG. 1.

FIG. 2 illustrates an example of a circuit configuration for a power routing unit according to further embodiments. A power routing unit 210 includes a three-phase static switch 212, which is implemented using pairs of anti-parallel connected silicon controlled rectifiers (SCRs). The static switch 212 is coupled between an AC input port 211 and an AC output port 213 of the power routing unit. The power routing unit 210 further includes a three-phase bridge circuit 214, which incorporates transistors Q (e.g., IGBTs or power MOSFETs) coupled respective half-bridge pairs for the respective phases and respective inductors L for the respective phases. The bridge circuit 214 is coupled between the AC output port 213 and a DC port 215. The bridge circuit 214 may further include one or more DC link capacitors C coupled to the DC port 215, which may provide energy storage to support maintenance of a voltage on a DC bus connected to the DC port 215, but it will be appreciated that such capacitance could be provided or supplemented by capacitors located external to the power routing unit 210. A control circuit 216 is configured to control the static switch 212 and the bridge circuit 214 to provide various modes of operation that support various power flows between the AC ports 211, 213 and the DC port 215. The control circuit 215 may be implemented using any of a variety of different analog and/or digital circuits, including, for example, control circuitry employing data processing circuitry, such as microcontroller or microprocessor.

According to some embodiments, power routing units along the lines described above with reference to FIGS. 1 and 2 may be used to provide a variety of different uninterruptible power supply (UPS) systems. For example, referring to FIG. 3, a UPS system may include first and second power routing units 310a, 310b, each of which includes a static switch 312, a converter circuit 314 and a control circuit 316 that controls the static switch 312 and the converter circuit 314. Respective first and second sources 10a, 10b are coupled to the AC input ports of respective ones of the power routing units 310a, 310b, and respective loads 20a, 20b are connected to the AC output ports of respective ones of the power routing units 310a, 310b. DC ports of the power routing units 310a, 310b are connected in common to a DC bus 320.

Figure 3:
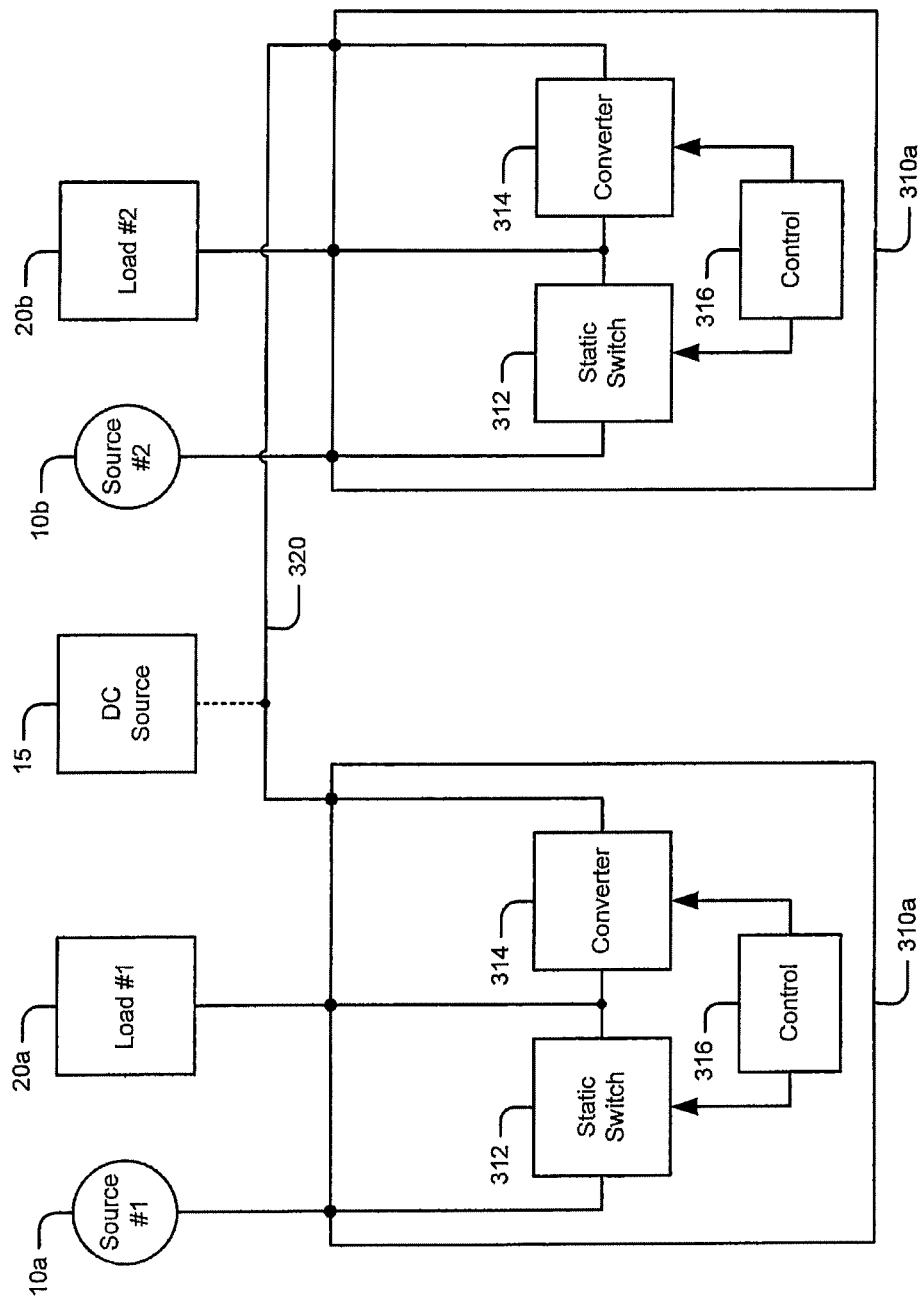
FIG. 3 is a schematic diagram illustrating a static UPS system according to some embodiments.

The arrangement illustrated in FIG. 3 may be implemented as a battery-free static UPS system. In particular, under normal operating conditions, power may be provided to the first and second loads 20a, 20b from respective ones of the first and second AC sources 10a, 10b via the static switches of respective ones of the first and second power routing units 310a, 310b. Responsive to failure of, for example, the first AC source 10a, power may be provided to the first load 20a from the second power source 20b via the converter circuit 314 of the second power routing unit 310b, the DC bus 320, and the converter circuit 314 of the first power routing unit 310a. Similarly, in response to failure of the second AC source 10b, power may be provided to the second load 20b from the first AC source 10a via the converter circuit 314 of the first power routing unit 310a, the DC bus 320, and the converter circuit 314 of the second power routing unit 310b.

As further shown in FIG. 3, a DC power source 15 may be coupled to the DC bus 320. The DC power source 15 may include, for example, a battery, fuel cell generator, photovoltaic source, or the like. In some embodiments, the DC source 15 may be used to provide additional backup power in case of failure of either or both of the AC sources 10a, 10b. In further embodiments, the DC source 15 may be used, for example, to support power sharing operations, such as peak shaving operations that use the DC source 15 to provide supplemental power during peak rate periods for either or both of the AC sources 10a, 10b.

Figure 4:
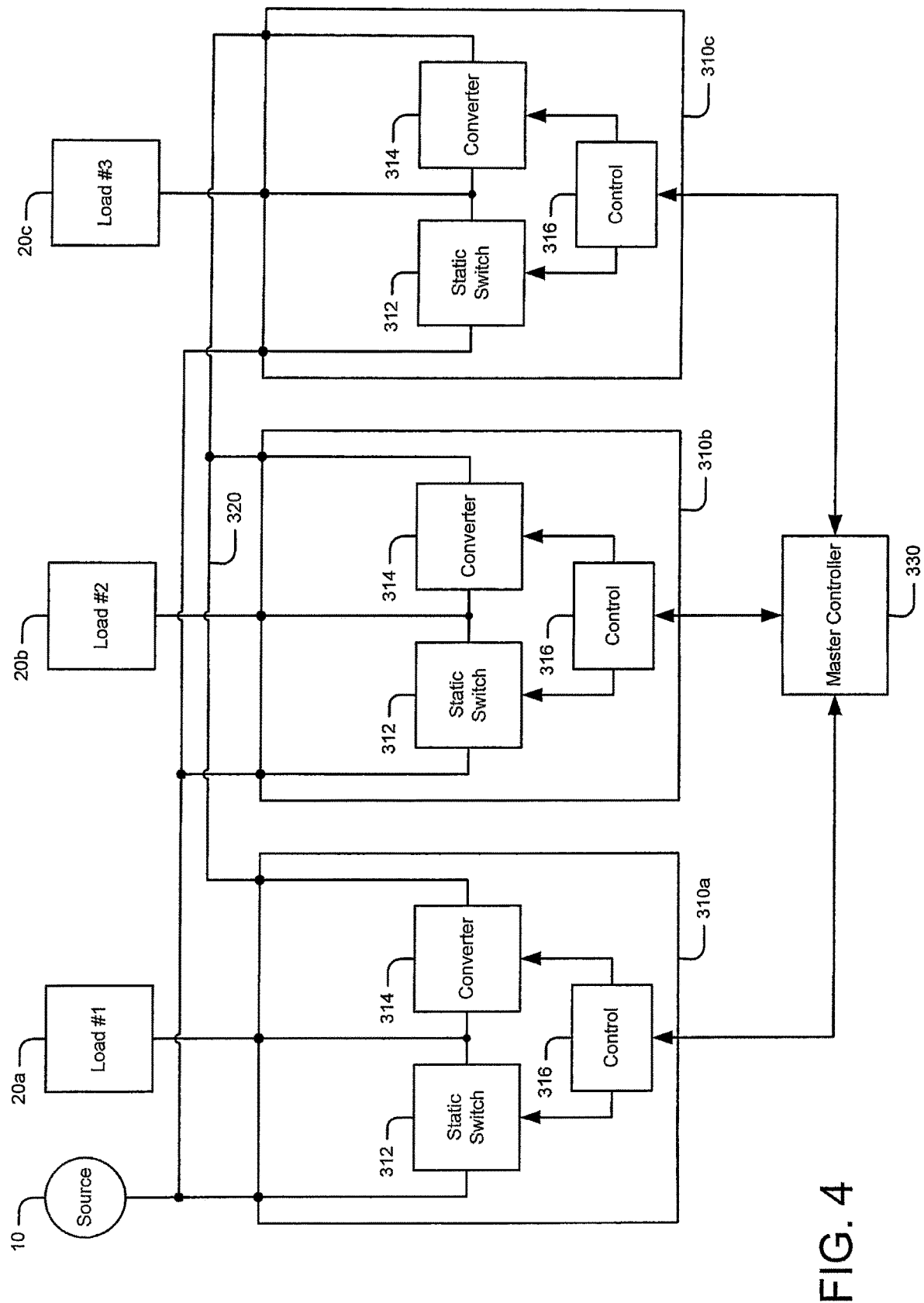
FIG. 4 is a schematic diagram illustrating catcher UPS system according to some embodiments.
Figure 5:
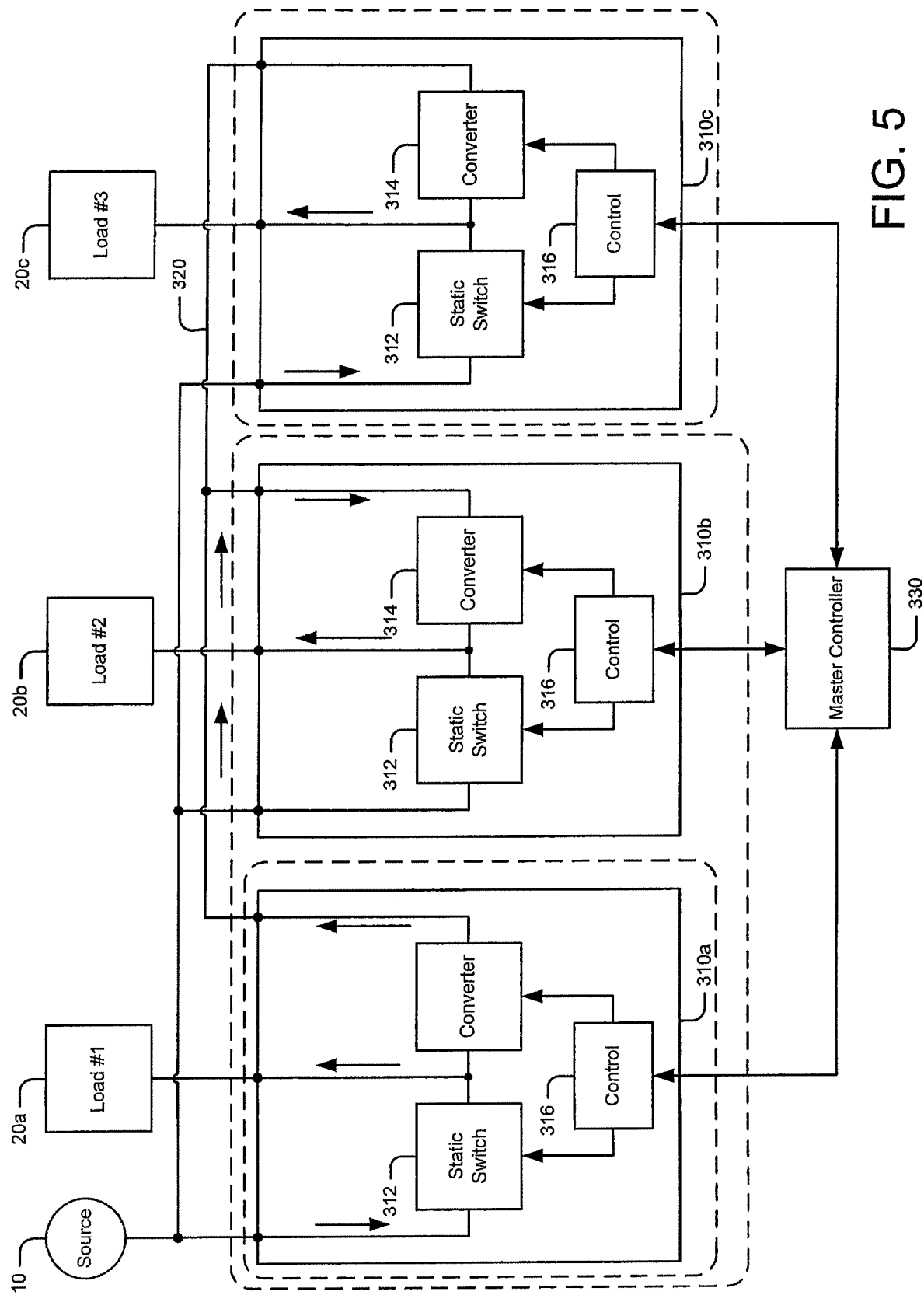
FIGS. 5 and 6 is a schematic diagram illustrating a UPS system with reconfigurable operational modes using power routing units according to some embodiments.

FIG. 4 illustrates another UPS system arrangement that advantageously uses power routing units as described above. First, second and third power routing units 310a, 310b, 310c have AC output connected to respective loads 20a, 20b, 20c, have their AC input ports connected in common to an AC source 10 and have their DC ports coupled in common to a DC bus 320. Each of the first, second and third power routing units 310a, 310b, 310c includes a static switch 312, a converter circuit 314 and a control circuit 316 that controls the static switch 312 and the converter circuit 314. A master controller 30 is configured to communicate with the control circuits 316 to provide monitoring and supervisory control.

The power routing units 310a, 310b, 310c may be operated to provide backup power delivery options. For example, under normal conditions, the power routing units 310a, 310b, 310c may provide power their respective loads 20a, 20b, 20c via their static switches 312. In response to failure of, for example, the static switch 312 of the first power routing unit 310a, the second and third power routing units 310b, 310c may provide power to the first load 20a via the DC bus 320. Such operations may be controlled by the master controller 330, which may, for example, receive status information from the first power routing unit 310a indicating failure of its static switch 312, and may command the first power routing unit 310a to operate its converter circuit 314 as an inverter to provide power to the first load 20a. The master controller 330 may concurrently command the second and third power routing units 310b, 310c to operate their converter circuits 314 as rectifiers to provide power needed to support operation of the converter 314 of the first power routing unit 310a.

The arrangement shown in FIG. 4 may also be used to support flexible configuration of power delivery paths that provide different levels of power security for loads having differing levels of criticality. For example, referring to FIG. 5, the second load 20b may have a greater criticality than the first and third loads 20a, 20c, and the first and second power routing units 310a, 310b may be used to provide a double conversion chain for providing increased power quality for the second load 20b. In particular, the first power routing unit 310a may provide power to the first load 20a via its static switch 312, and may concomitantly operate its converter circuit 314 as a rectifier to provide power to the DC bus 320. The second power routing unit 310b may open its static switch 312 and operate its converter circuit 314 as an inverter to provide power to the second load 20b from the DC bus 320, thus isolating the second load 20b from quality deviations of the AC source 10. In this functional mode, the static switch 312 of the second power routing unit 310b may be used as in a manner similar to that way a static bypass switch is used in a conventional double conversion UPS. For example, the static switch 312 of the second power routing unit 310b may be closed and the converter circuit 314 of the second power routing unit 310b may e inactivated responsive to a power quality of the AC source 10 meeting a certain power quality criterion, such that the second load 20b may be provided power in a more efficient manner. If the power quality of the AC source 10 again deviates, the static switch 312 may be opened and the second load 20b again powered using the double conversion power train.

Figure 6:
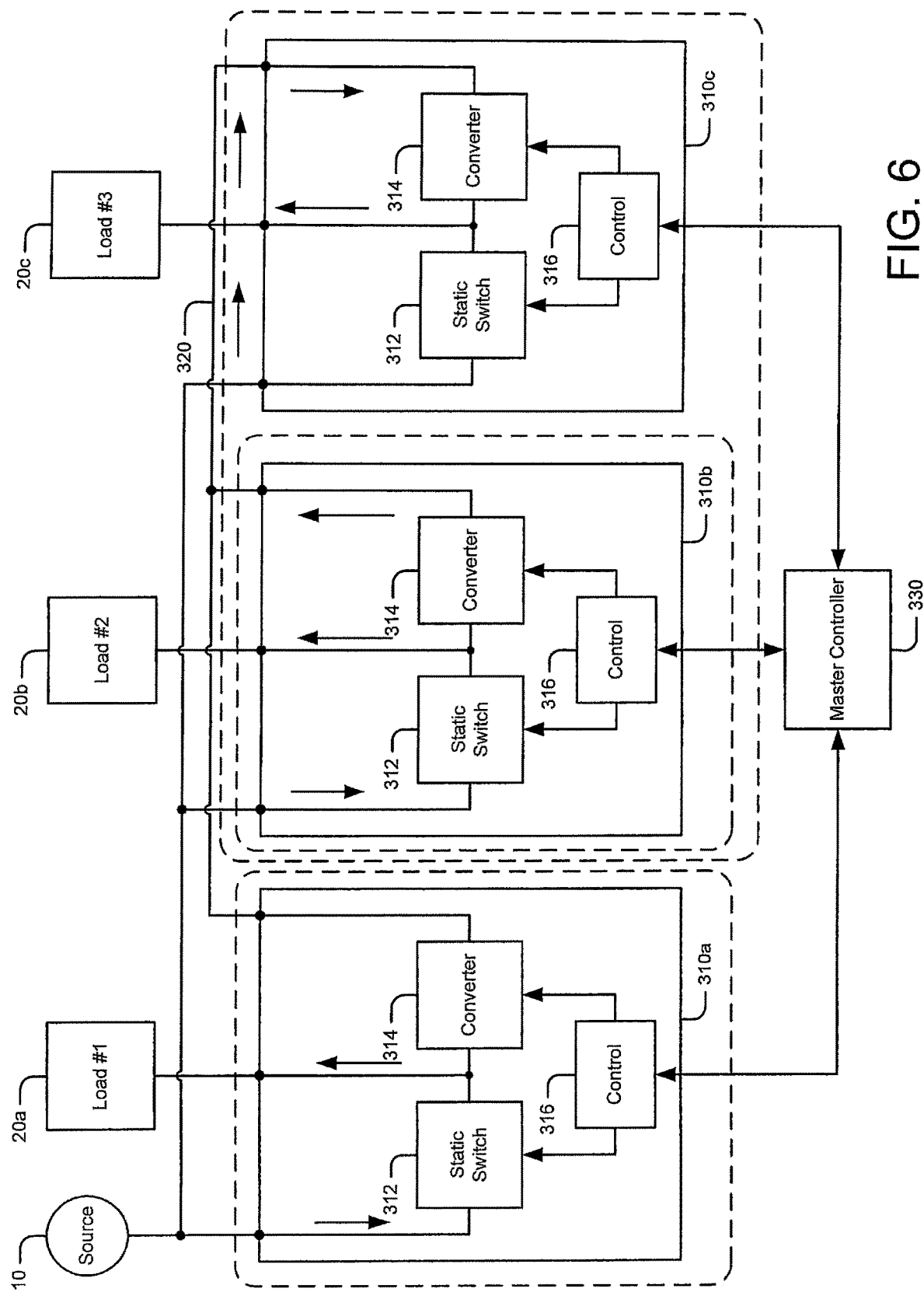

In further embodiments, the third power routing unit 310c may be used in a similar manner, such that both of the first and third power routing units 310a, 310c provide power to the DC bus 320 for use by the converter circuit 314 of the second power routing unit 310b. Power security allocations may also be dynamically adjusted. For example, as shown in FIG. 6, the system may be configured to transition to operating the converter circuits 314 of the second and third power routing units 310b, 310c to provide double conversion power train for the third load 20c. Such dynamic configurability may be particularly useful in some applications, such as data center applications in which the loads 20a, 20b, 20c are different groups of servers or other computing equipment that run processes that have changing power security needs.

Figure 7:
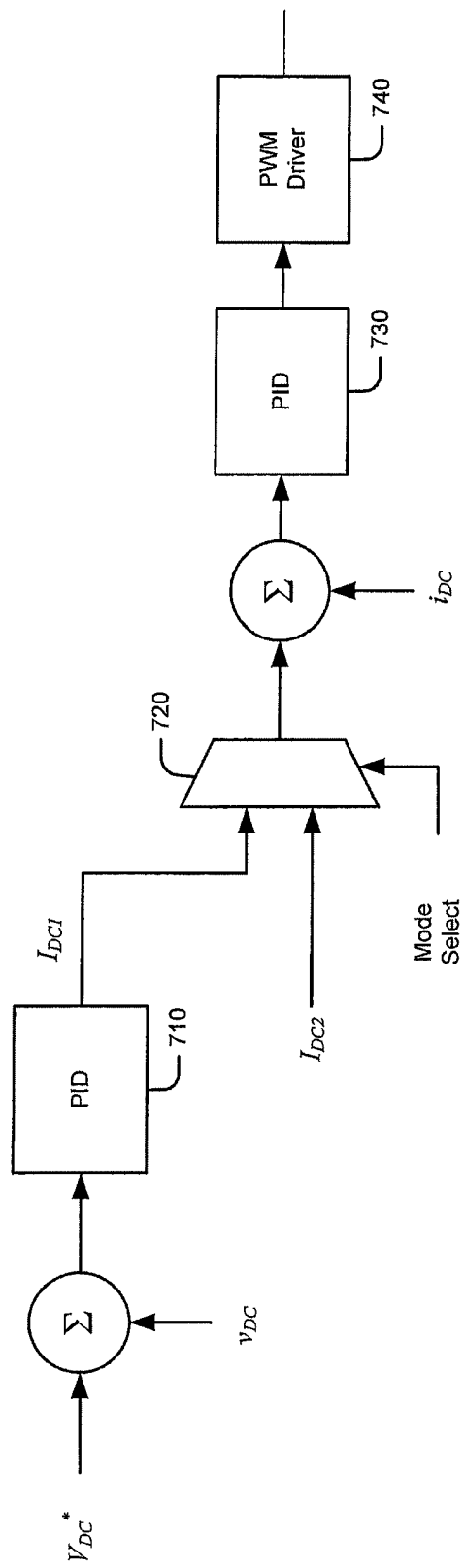
FIG. 7 is a schematic diagram illustrating a control architecture for DC bus control in a UPS system according to some embodiments.
Figure 8:
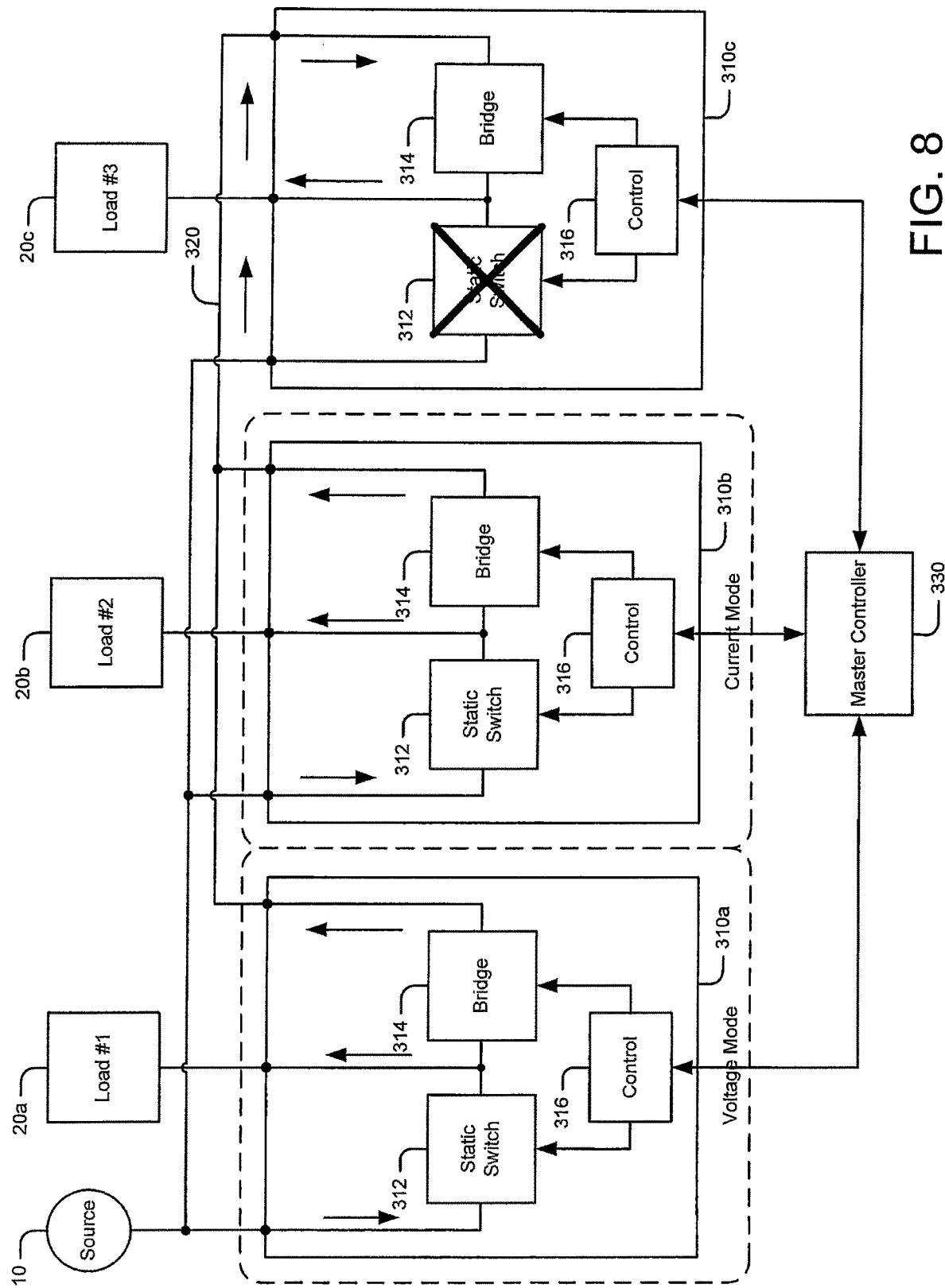
FIG. 8 is a schematic diagram illustrating applications of the control architecture of FIG. 7 in a UPS system according to some embodiments.
Figure 9:
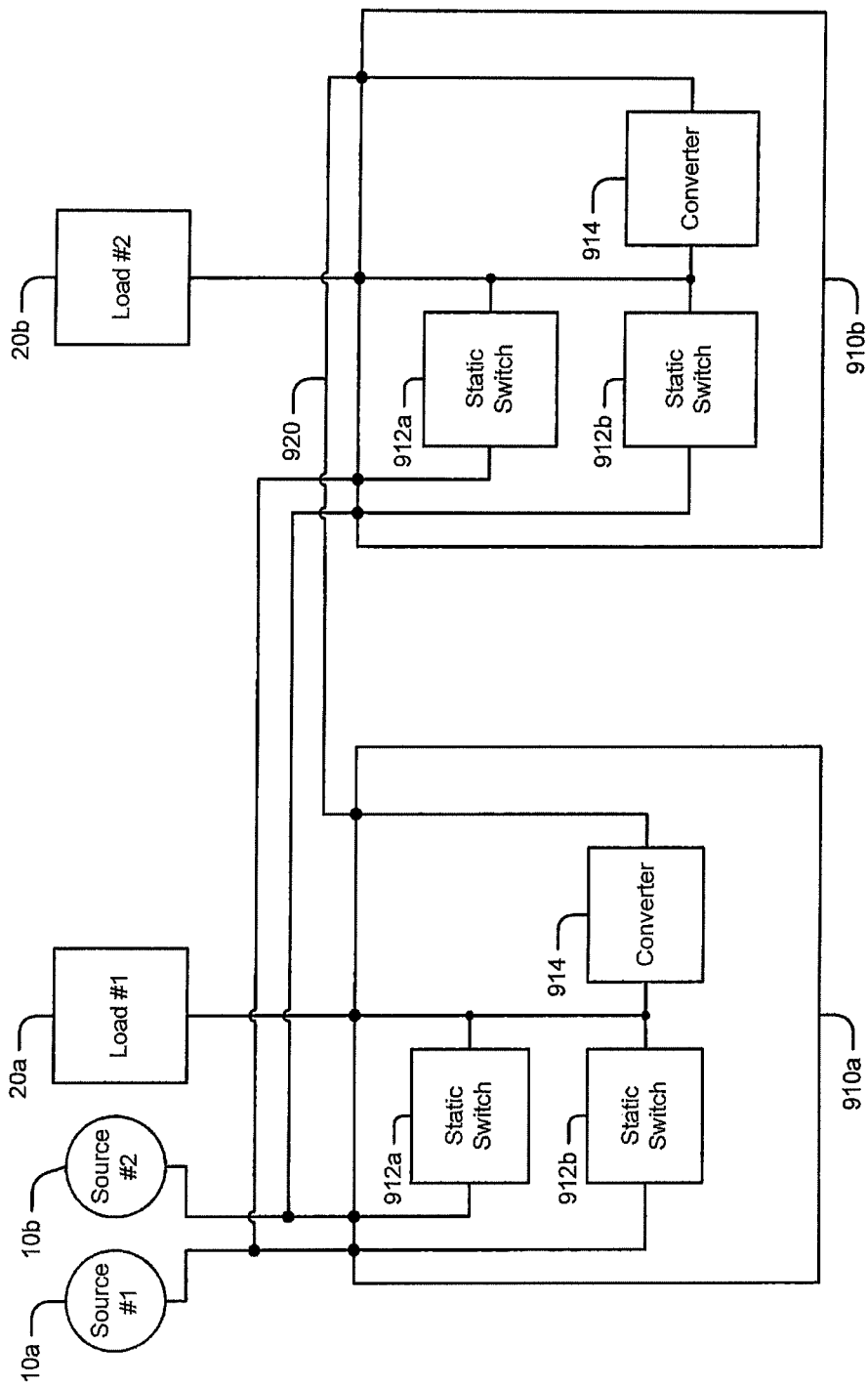
FIG. 9 is a schematic diagram illustrating a UPS system using power routing units with multiple static switches according to some embodiments.

FIG. 7 illustrates a control architecture that may be used to support power transfers among power routing units according to further embodiments. Referring to FIG. 7 in conjunction with FIG. 8, power routing units 310a, 310b, 310c may be configured to operate their converter circuits 314 to provide voltage or current control of the DC bus 320. As shown in FIG. 8, the first and second power routing units 310a, 310b may be used to provide power to the third power routing unit 310c having a failed static switch 312. To facilitate this transfer, the converter circuit 314 of the first power routing unit 310a may be operated in a voltage control mode wherein it maintains a desired voltage on the DC bus 320, while the converter circuit 314 of the second power routing unit 310 is used in a controlled current mode wherein it provides a desired amount of current to the DC bus 320. The amount of current provided by the second power routing unit 310b may be commanded by the master controller 330.

Each of the power routing units 310a, 310b, 310c may be configured to provide a control architecture supporting multiple control modes for their converters 314. In a voltage control mode, a compensator 710 of a voltage loop provides a first current command $I_{DC1}$ via a selector 720 to a current loop having a compensator 730 that provides a control signal to a pulse width modulation (PWM) driver circuit 740, which drives transistors or other switching elements of the converter. When operating in a current control mode, however, the selector 720 provides a second current command $I_{DC2}$ to the current loop instead, wherein the second current command $I_{DC2}$ represents a desired current output of the converter. The second current command $I_{DC2}$ may be provided, for example, from the master controller 330. The compensators 710, 730 may take any of a variety of different forms, including, but not limited to, proportional, differentiator, integrator, proportional integrator-differentiator (PID), lead-lag, and combinations thereof.

According to further embodiments, a power routing unit may include more than one static switch to support other UPS system configurations. For example, referring to FIG. 9, a system may include first and second power routing units 910a, 910b, each of which includes first and second static switches 912a, 912b and a converter circuit 914. AC output ports of the first and second power routing units 910a, 910b are coupled to respective first and second loads 20a, 20b. First and second AC inputs of the power routing units 910a, 910b are connected to respective ones of first and second AC sources 10a, 10b. DC ports of the first and second power routing units 910a, 910b are coupled in common to a DC bus 920.

This arrangement can be used to provide flexibility in power routing and redundancy in the event of component or source failure. For example, this arrangement allows the loads 20a, 20b to be coupled to either of the AC sources 10a, 10b via the static switches 912a, 912b. This arrangement can also be used to provide a double conversion power chain for either of the loads 20a, 20b.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
a plurality of power routing units, each comprising:
  a first AC port;
  a second AC port;
  a static switch configured to couple and decouple the first AC port and the second AC port;
  a DC port; and
  a converter circuit coupled between the second AC port and the DC port,
wherein the DC ports of the power routing units are coupled in common to a DC bus; and
a control circuit configured to detect a failure of the static switch of a first power routing unit and to responsively transfer power from a second power routing unit to a load connected to the second AC port of the first power routing unit via the DC bus and the converter circuit of the first power routing unit.

2. The system of claim 1, wherein the first AC ports of the first and second power routing units are connected to the same AC source.

3. The system of claim 2, wherein the load connected to the second AC port of the first power routing unit comprises a first load and wherein the second AC port of the second power routing unit is connected to a second load.

4. The system of claim 1, wherein the control circuit is configured to detect the failure of the static switch of the first power routing unit and to responsively transfer power from the second power routing unit and a third power routing unit to the load connected to the second AC port of the first power routing unit via the DC bus and the converter circuit of the first power routing unit.

5. The system of claim 1, wherein the control circuit comprises respective control circuits associated with respective ones of the power routing units.

6. A system comprising:
a plurality of power routing units, each comprising:
  a first AC port;
  a second AC port;
  a static switch configured to couple and decouple the first AC port and the second AC port;
  a DC port; and
  a converter circuit coupled between the second AC port and the DC port,
wherein the DC ports of the power routing units are coupled in common to a DC bus and wherein the power routing units are selectively combinable to provide at least one double conversion uninterruptible power supply (UPS).

7. The system of claim 6, wherein the at least one double conversion UPS comprises the converter circuit of a first power routing unit operating as a rectifier receiving AC power from its first AC port and the converter circuit of a second power routing unit operating as an inverter providing power to a load connected to its second AC port.

8. The system of claim 6, wherein the first and second power routing units are configurable to operate as the double conversion UPS in a first configuration and to independently serve respective first and second loads in a second configuration.

9. The system of claim 6, wherein the power routing units are configurable to independently serve respective loads.

10. A method of operating a system comprising a plurality of power routing units, each including a first AC port, a second AC port, a DC port, a static switch configured to couple the first AC port and the second AC port, and a converter circuit coupled between the second AC port and the DC port, the method comprising:
coupling the DC ports of the power routing units in common to a DC bus;
detecting a failure of the static switch of a first power routing unit; and
responsively transferring power from a second power routing unit to an AC load connected to the first power routing unit via the DC bus and the converter circuit of the first power routing unit.

11. The method of claim 10, wherein the first AC ports of the first and second power routing are connected to the same AC source.

12. The method of claim 11, wherein the load connected to the first power routing unit comprises a first load connected to the second AC port of the first power routing unit and wherein the second AC port of the second power routing unit is connected to a second AC load.

13. The method of claim 10, further comprising transferring power from a third power routing unit to the load via the DC bus and the converter circuit of the first power routing unit responsive to the detected failure.

* * * * *